United States Patent Office 3,553,241
Patented Jan. 5, 1971

3,553,241
AZACYCLOALKYLFERROCENE
John T. Suh and Claude I. Judd, Mequon, Wis., assignors to Colgate-Palmolive Company, New York, N.Y., a corporation of Delaware
No Drawing. Filed Oct. 9, 1968, Ser. No. 766,290
Int. Cl. A61k 25/02; C07f 15/02
U.S. Cl. 260—439
2 Claims

ABSTRACT OF THE DISCLOSURE

The compounds are azacycloalkylferrocenes useful as petroleum additives and hematinic agents. A compound disclosed is 1,1'-($\alpha$-azabutylene)ferrocene.

DESCRIPTION OF THE INVENTION

The compounds of the present invention may be represented by the following formula:

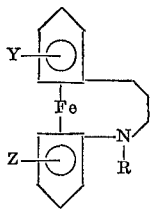

I in which X and Y are hydrogen, trifluoromethyl, or a lower alkyl of 1 to 4 carbon atoms such as methyl, ethyl or isopropyl and R is hydrogen, an alkyl group of 1 to 8 carbon atoms such as methyl, ethyl, isopropyl, hexyl and octyl, a phenyl-lower alkyl of 7 to 13 carbon atoms such as benzyl, phenethyl and phenylisopropyl and a hydroxy-lower alkyl group such as hydroxyethyl.

The compounds of the present invention may be conveniently prepared from the carboxylic ketones of the formula

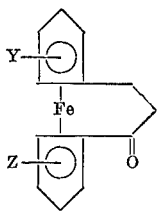

II in which Y and Z are as previously described. Representative of the ketones that may be employed in the present invention are the following compounds:

$\alpha$-keto-1,1'-trimethyleneferrocene,
3,3'-dimethyl-$\alpha$-keto-1,1'-trimethyleneferrocene,
4-ethyl-$\alpha$-keto-1,1'-trimethyleneferrocene, and
3-methyl-$\alpha$-keto-1,1'-trimethyleneferrocene.

These compounds may be prepared by literature methods. For example, $\alpha$-keto-1,1'-trimethyleneferrocene may be prepared by treating $\beta$-ferrocene propionic acid with trifluoroacetic anhydride under anhydrous conditions.

The described ketones can then be treated with hydroxylamine hydrochloride in the presence of a suitable base, such as sodium hydroxide, to form the corresponding oxime which can, in turn, be treated with phosphorous pentachloride in a suitable solvent, such as tetrahydrofuran, to form the corresponding acid lactam. The lactam, upon reduction with lithium aluminum hydride forms the desired compounds in which R is hydrogen. The above described process may be illustrated as follows:

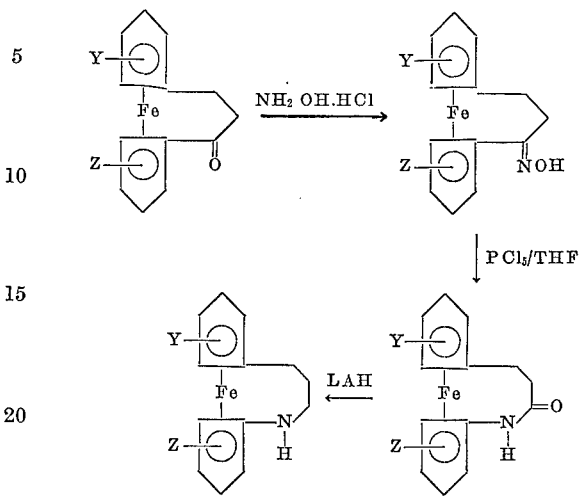

Representative of the compounds that may be prepared by this process are the following:

1,1'-($\alpha$-azabutylene)ferrocene,
3,3'-dimethyl-1,1'-($\alpha$-azabutylene)ferrocene,
4-ethyl-1,1'-($\alpha$-azabutylene)ferrocene, and
3-methyl-1,1'-($\alpha$-azabutylene)ferrocene The compounds in which R is other than hydrogen may be prepared by direct alkylation and other conventional techniques for preparing tertiary amines from secondary amines.

The azacyclic ferrocenes of the present invention are highly stable organoiron compounds which are useful in a wide variety of chemical procedures, for example, in polymerization reactions such as described in U.S. Pat. No. 3,287,314. In addition, the novel compounds can be used as petroleum additives, such as anti-knock agents, in the manner described in U.S. Pat. No. 3,285,946 and U.S. Pat. No. 3,294,685.

The novel compounds of the present invention have also been found to be useful as hematinic agents for the treatment of iron deficiencies in animals. When employed for such purposes they are preferably combined with suitable pharmaceutical diluents such as flavoring agents and the like and formed into unit dosage forms particularly adapted for oral administration.

The effectiveness of the compounds as agents for treating iron deficiency anemia was readily established in the laboratory by administering the compounds to rats which had been made anemic by maintaining them on an iron deficient diet for extended periods of time. The compounds were found to be effective in treating diet-induced iron deficiency anemia in daily oral doses of 3 mg. Fe/Kg.

The following examples illustrate the preparation of the compounds of the present invention:

Example 1.—$\alpha$-keto-1,1'-trimethyleneferrocene oxime

To a cooled solution of 0.87 g. (0.022 mole) of sodium hydroxide and 1.53 g. (0.022 mole) of hydroxylamine hydrochloride in 30 ml. of water is added 4.8 g. (0.02 mole) of $\alpha$-keto-1,1'-trimethyleneferrocene in 100 ml. of ethanol in 10 minutes. The mixture is then rapidly heated to 75° and allowed to cool slowly with stirring to room temperature and then diluted with 200 ml. of water and cooled. The precipitated solids are collected, washed with water and recrystallized from methanol to yield $\alpha$-keto-1,1'-trimethyleneferrocene oxime as a yellow crystalline solid, M.P. 175.5–178.5°.

*Analysis.*—Calc'd for $C_{13}H_{13}FeNO$ (percent): C, 61.19; H, 5.14; N, 5.49. Found (percent): C, 61.32; H, 5.43; N, 5.75.

Example 2.—β-(1-aminoferrocen-1-yl)propionic acid lactam

To a solution of 6.9 g. (0.027 mole) of α-keto-1,1′-trimethyleneferrocene oxime in 200 ml. of tetrahydrofuran cooled to 0° is added 5.5 g. (0.027 mole) of phosphorus pentachloride in 3 minutes and the mixture is stirred for 20 minutes at 0–4°. The mixture is poured into 300 ml. of brine and extracted four times with 50 ml. portions of chloroform. The combined extracts are washed with brine, dried, filtered through celite and concentrated to yield a dark solid which is recrystallized twice from methanol to yield β-(1-aminoferrocen-1-yl)-propionic acid lactam as yellow platelets, M.P. 264°.

*Analysis.*—Calc'd for $C_{13}H_{13}FeNO$ (percent): C, 61.20; H, 5.14; N, 5.50. Found (percent): C, 61.30; H, 5.29; N, 5.70.

Example 3.—1,1′-(α-azabutylene)ferrocene

To a dispersion of 0.62 g. (0.016 mole) of lithium aluminum hydride in 50 ml. of dried tetrahydrofuran is added a solution of 1.04 g. (0.004 mole) of β-(1-aminoferrocen-1-yl)propionic acid lactam in 200 ml. of warm tetrahydrofuran in 5 minutes. The solution is stirred at room temperature for 3.5 hours after which the complex is decomposed by the dropwise addition of 6 ml. of water. The solids were removed by filtration and the filtrate dried and concentrated to yield a solid which is recrystallized twice from cyclohexane to yield 1,1′-(α-azabutylene)ferrocene as a yellow brown crystalline solid, M.P. 146–148°.

*Analysis.*—Calc'd for $C_{13}H_{15}FeN$ (percent): C, 64.74; H, 6.27; N, 5.81. Found (percent): C, 64.70; H, 6.54; N, 5.74.

We claim:
1. Compounds selected from compounds of the formula

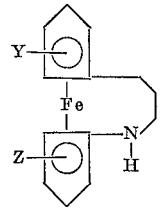

wherein Y and Z are hydrogen or lower alkyl of 1 to 4 carbon atoms.
2. A compound of claim 1 in which Y and Z are hydrogen.

References Cited
UNITED STATES PATENTS
| | | | |
|---|---|---|---|
| 3,382,267 | 5/1968 | Suh | 260—439 |
| 3,417,118 | 12/1968 | Schnettler et al. | 260—439 |

OTHER REFERENCES
Schlögl et al.: Monatsh. Chem. 97 (1966), pp. 150–67.
Brown: Organic Reactions, vol. VI, John Wiley and Son Inc., New York, N.Y., pp. 470–1.
Migrdichian: Organic Snythesis, vol. I, Reinhold Publishing Corp., New York, N.Y., p. 372.

TOBIAS E. LEVOW, Primary Examiner

A. P. DEMERS, Assistant Examiner

U.S. Cl. X.R.

252—431; 424—295